United States Patent [19]

Lucas

[11] 4,293,059
[45] Oct. 6, 1981

[54] DETENT MECHANISM AND TRANSMISSION SPEED RANGE SELECTOR VALVE

[75] Inventor: James H. Lucas, Milwaukee, Wis.

[73] Assignee: Allis-Chalmers Corporation, Milwaukee, Wis.

[21] Appl. No.: 72,362

[22] Filed: Sep. 5, 1979

[51] Int. Cl.³ .................. B60K 41/24; F16D 67/04; F16K 11/10; F15B 11/15

[52] U.S. Cl. .................. 192/3.57; 192/3.62; 192/4 C; 192/13 R; 74/481; 137/596.1; 137/625.69; 251/297

[58] Field of Search .................. 192/3.62, 3.54, 3.57, 192/3.63, 4 A, 4 C, 12 C, 13 R, 87.13, 87.18, 87.19, 109 F; 74/481, 364, 527, DIG. 11; 137/624.27, 625.69, 596.1; 251/297; 91/426

[56] References Cited

U.S. PATENT DOCUMENTS

| | | | |
|---|---|---|---|
| 2,998,732 | 9/1961 | Nelson | 74/364 |
| 3,093,158 | 6/1963 | Tennis | 251/297 X |
| 3,253,614 | 5/1966 | McCav, Jr. | 137/625.69 X |
| 3,476,148 | 11/1969 | McMillen | 251/297 X |
| 3,640,146 | 2/1972 | Barnes | 192/87.19 X |
| 3,722,542 | 3/1973 | Matthews et al. | 137/596.1 |
| 3,738,379 | 6/1973 | Wilke | 137/625.69 X |
| 3,780,762 | 12/1973 | Matthews et al. | 192/87.19 X |
| 3,837,359 | 9/1974 | Nelson et al. | 137/624.27 |
| 3,855,875 | 12/1974 | Hansen | 74/481 |
| 3,866,880 | 2/1975 | Schexnayder | 251/297 |

*Primary Examiner*—George H. Krizmanich
*Attorney, Agent, or Firm*—Arthur L. Nelson

[57] ABSTRACT

A transmission speed range selector valve pressure biased to the high speed range position and spring biased toward the low speed range position. A detent mechanism for retaining the valve in the low speed range arrests the movement of the valve when the pressure of the pressure biasing fluid decreases allowing the spring to move the valve toward the low speed range and thereby downshift the transmission when fluid is throttled to the speed range selector valve.

10 Claims, 5 Drawing Figures

DETENT MECHANISM AND TRANSMISSION SPEED RANGE SELECTOR VALVE

This invention relates to a transmission speed range selector valve pressure biased to the high speed range position in response to pressure of the operating fluid with a spring biasing the spool of the speed range selector valve toward the low range position. A detent mechanism on the spool arrests the spool movement at the low speed range position as it moves from the high speed range position toward the low and reverse speed range positions. The speed range selector valve is for use in a power shift transmission and automatically downshifts the transmission prior to the inching operation of the vehicle transmission due to throttling of the fluid supplied to the speed range selector valve.

A power shift transmission on a tractor utilizes pressurized fluid for engaging and disengaging of the clutches while operating at the various speed ranges. The high-low speed ranges provide upshifting and downshifting of the transmission to accommodate the various loads applied to the tractor and variation of traction and throttle conditions as the tractor is operated. Similarly, the low reverse shuttle clutch shifting of the transmission provides power shifting for convenient forward and rearward movement of the vehicle forwardly and rearwardly. The shuttle clutch utilizes an accumulator in the hydraulic system which modulates the clutch pressure to provide smooth transmission of power as the one clutch is engaged and the other is disengaged. The modulation of the clutch pressure is automatic.

It is also advantageous to provide inching of the vehicle transmission through an inching valve. The inching valve provides for manual modulation of the fluid pressure for operating the vehicle clutches. The inching valve supplies pressurized fluid to the speed range selector valve which is throttled as it passes from the pump to the speed range selector valve. During normal operation, the speed range selector valve is held in the high clutch operating position by pressure of the operating fluid supplied to a pressurizing chamber biasing the spool to the high clutch operating position. A spring is also provided in the spool valve biasing the spool against the force of the fluid pressure and which is normally insufficient to overcome the force of the pressurized fluid. During inching of the vehicle transmission by the inching valve, the fluid is throttled in the inching valve reducing the pressure in the pressurizing chamber of the speed selector valve and permitting the spring to bias the spool valve from the high range position toward the low and reverse positions. A detent mechanism arrests the spool as it passes from high to the low speed range position and retains the valve in this position as the vehicle transmission is downshifted during the inching operation. The valve is retained in this position by the detent mechanism until manually shifted to high or reverse as desired by the operator.

Accordingly, it is an object of this invention to provide a detent mechanism to retain the spool in the low speed range as the return spring biases the valve from the high speed range during inching operation.

It is another object of this invention to provide a pressure biased transmission speed range selector valve to retain the valve in the high speed range responsive to pressure of the actuating fluid in the valve. The force of the pressurized fluid in the pressurizing chamber operates against a spring which normally biases the valve from the high speed range toward the low speed range and the reverse speed range positions. A decrease in pressure, by disengaging engine clutch, allows the valve to move to the low speed range where a detent mechanism arrests further movement of the valve beyond the low speed range when the pressure supplied to the speed range selector valve is decreased below a predetermined pressure level.

It is another object of this invention to provide a detent mechanism to retain the spool in the reverse speed range that is unaffected by biasing spring or pressurized fluid.

It is another object of this invention that the operator may manually select high, low or reverse speed range and the spool will remain in that position until manually moved or the engine clutch is disengaged.

It is a further object of this invention to provide a detent mechanism in a transmission speed range selector valve provided with a pressurizing chamber normally biasing the spool to the high speed range position responsive to pressure of the actuating fluid flowing through the speed range selector valve. A spring biases the spool of the valve toward the low and reverse speed range positions and overcomes the force of the pressurized fluid in the pressurizing chamber when the pressure decreases below a predetermined pressure level which allows the spool to move toward the low speed range position. The detent mechanism retains the spool of the selector valve in the low speed range and prevents further movement of the valve responsive to the spring force as pressure in the valve decreases during throttling of the pressurized fluid supplied to the speed range selector valve during inching of the vehicle transmission.

The objects of this invention are accomplished in a transmission speed range selector valve having a pressurizing chamber containing fluid normally biasing the spool valve to the high speed range position responsive to pressure of the fluid in the fluid pressurizing chamber. The spool of the valve is also spring biased against the force of the pressurized fluid toward the low and reverse speed range positions. With the pressure decreasing in the fluid pressurizing chamber due to throttling of fluid during the inching operation by the inching valve which supplies pressurized fluid to the speed range selector valve, the spring biases the spool valve toward the low and reverse speed range positions. A detent mechanism, however, arrests the movement of the spool and retains the valve in the low speed range to assure that inching will be accomplished in the low speed range position.

The preferred embodiment of this invention is illustrated in the attached drawings.

Figure 1:
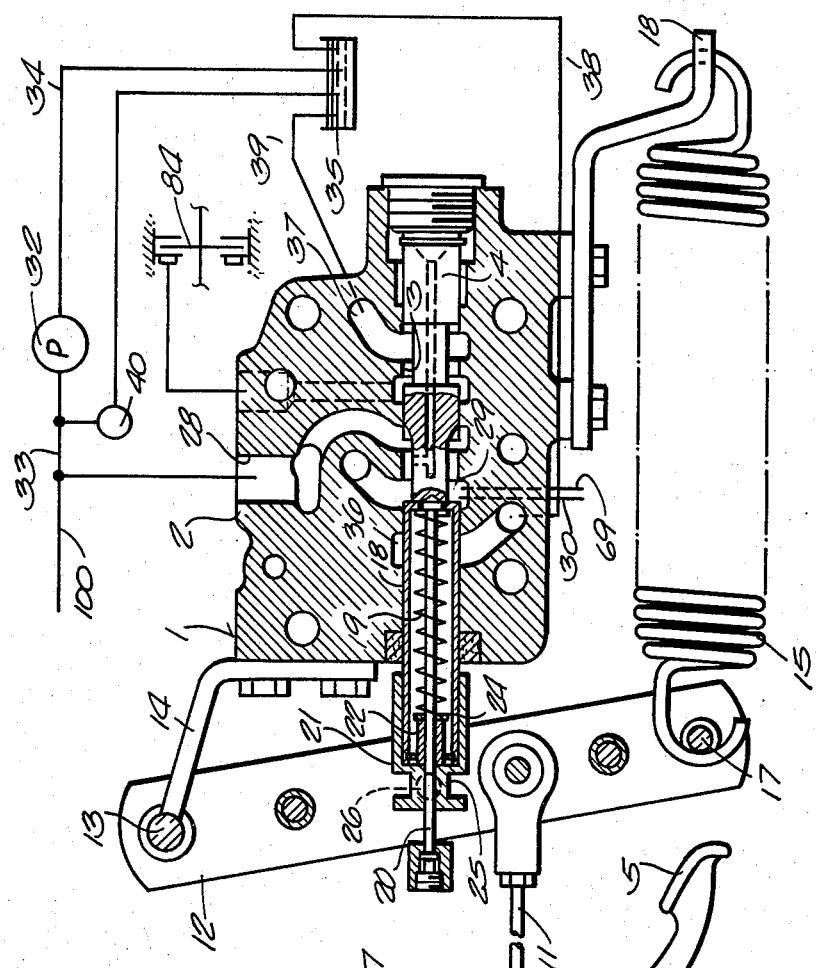
FIG. 1 illustrates a cross-section view of the inching valve and a partial schematic view of the hydraulic system.
Figure 2:
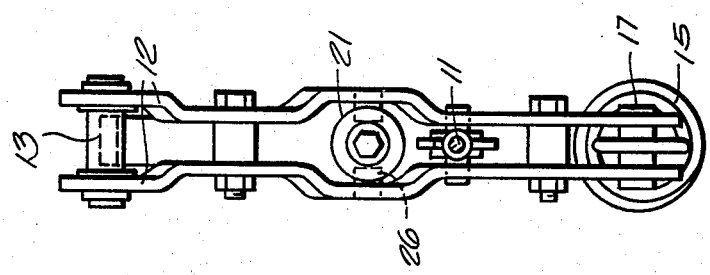
FIG. 2 is a partial cross-section view and end view of FIG. 1.

FIGS. 1 and 2 show the inching valve. The inching valve 1 includes a housing 2 defining a central opening 3 receiving a spool 4. The clutch pedal 5 is pivotally mounted on a vehicle chassis 6 by the shaft 7. The lug 9 engages the adjustable return stop 10 which is also mounted on the vehicle chassis 6. The clutch pedal 5 is pivotally connected to the push rod 11 which in turn is pivotally connected to the operating lever 12. The clutch pedal 5 also operates an engine clutch in the drive line (not shown). The operating lever 12 is mounted on the pin 13 which is supported on the bracket 14 carried on the valve housing 2. Return spring 15 connected to the pin 17 on the lower end of the lever 12 and bracket 18 returns the lever 12, clutch pedal 5, and the spool 4 to their normally retracted position, as shown. The spool 4 has a tubular end 18 which receives the spring 19 and the bolt 20. A cap 21 also receives the bolt 20 and encircles the tubular end 18 and bushing 22. Spring 19 is compressively positioned between the bushing 22 and washer 24 and the spool 4. The cap 21 is formed with an annular recess 25 which receives the pin 26 carried on the lever 12 providing means of operating the spool 4 by lever 12 and pedal 5.

The inlet pressure passage 28 is in communication through conduit 100 with pressure chamber 150 leading to accumulator passage 48 and conduit 49 to communicate with the low range clutch accumulator 50 when the speed range selector valve 31 is in the high and low positions.

With spool 4 in its normally retracted position as shown (FIG. 1), the inlet pressure passage 28 is also in communication with supply pressure chamber 29 of the inching valve and conduit 30 to passage 47 of the speed range selector valve 31. The passage 47 is selectively in communication with the high clutch passage 55 or low clutch passage 58. The high range clutch chamber 54 is in communication with the high range clutch passage 55 conduit 56 to the high range clutch 57. Low range clutch passage 58 is in communication with conduit 59 which is communicated through accumulator spool 151 to low clutch conduit 61 to low range clutch 60. Sump chambers 52, 53 and 64 are continuously in communication with conduit 65 to sump 35. Conduit 135 at the accumulator is connected to sump chamber 64.

The pump 32 pressurizes fluid in the conduit 33 and receives fluid from the conduit 34 and sump 35. Sump chambers 36 and 37 are connected to sump 35 through the return passages 38 and 39. Relief valve 40 returns excess fluid to the reservoir 35 and relieves excess pressure in the conduit 33. The spool 4 is normally retracted to the position shown in which the high pressure passage 28 is in communication with the supply pressure chamber 29 leading to conduit 30 and the transmission speed range selector valve 31. When the pedal 5 is completely depressed, fluid flow from the inching valve 1 to the selector valve 31 is interrupted and the transmission brake 84 is actuated.

Figure 3:
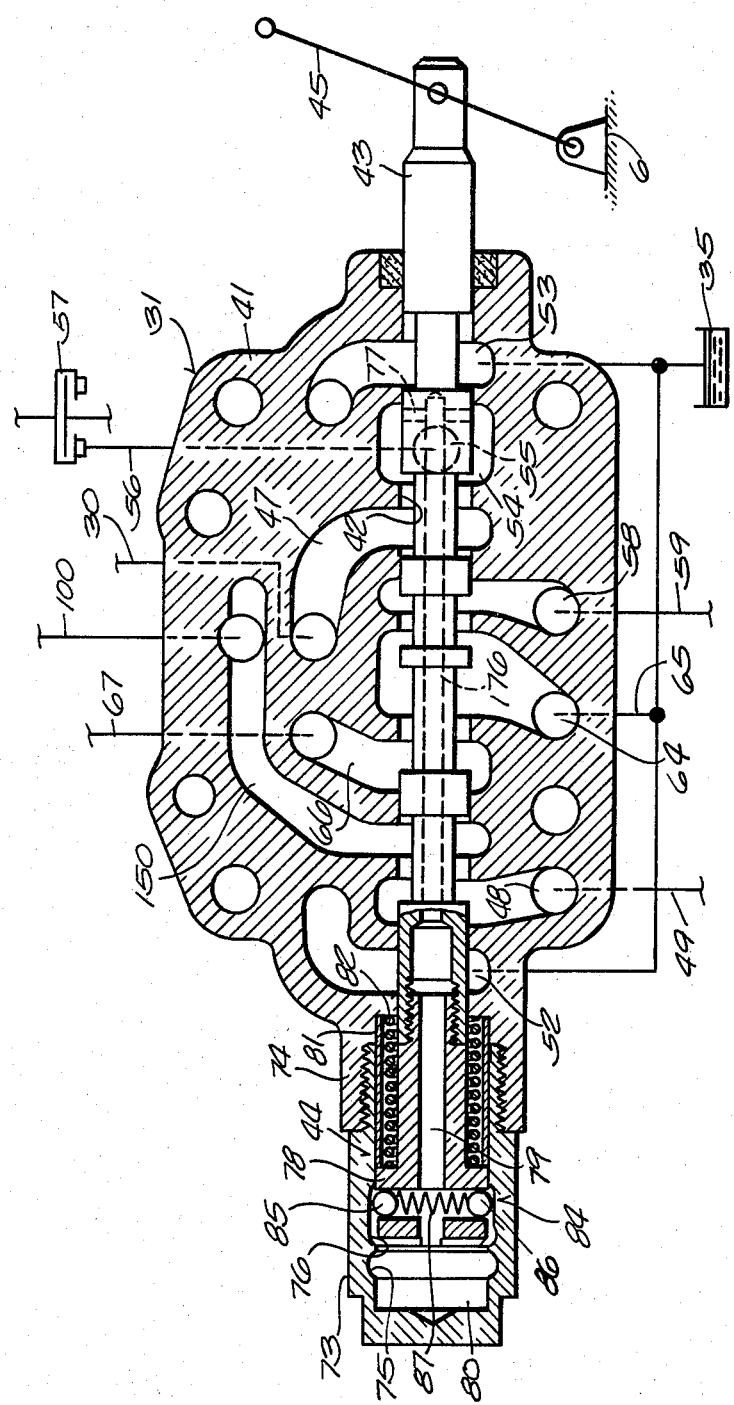
FIG. 3 is a cross-section view of the speed range selector valve.
Figure 4:
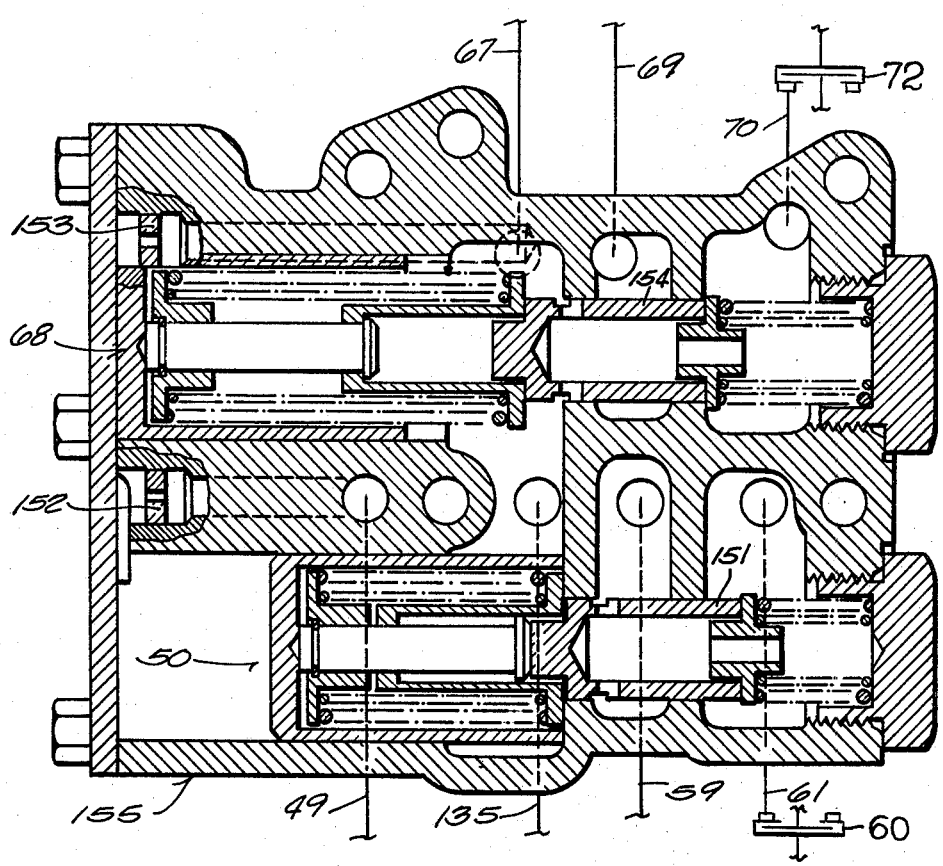
FIG. 4 is a cross-section view of the accumulator in the hydraulic system.
Figure 5:
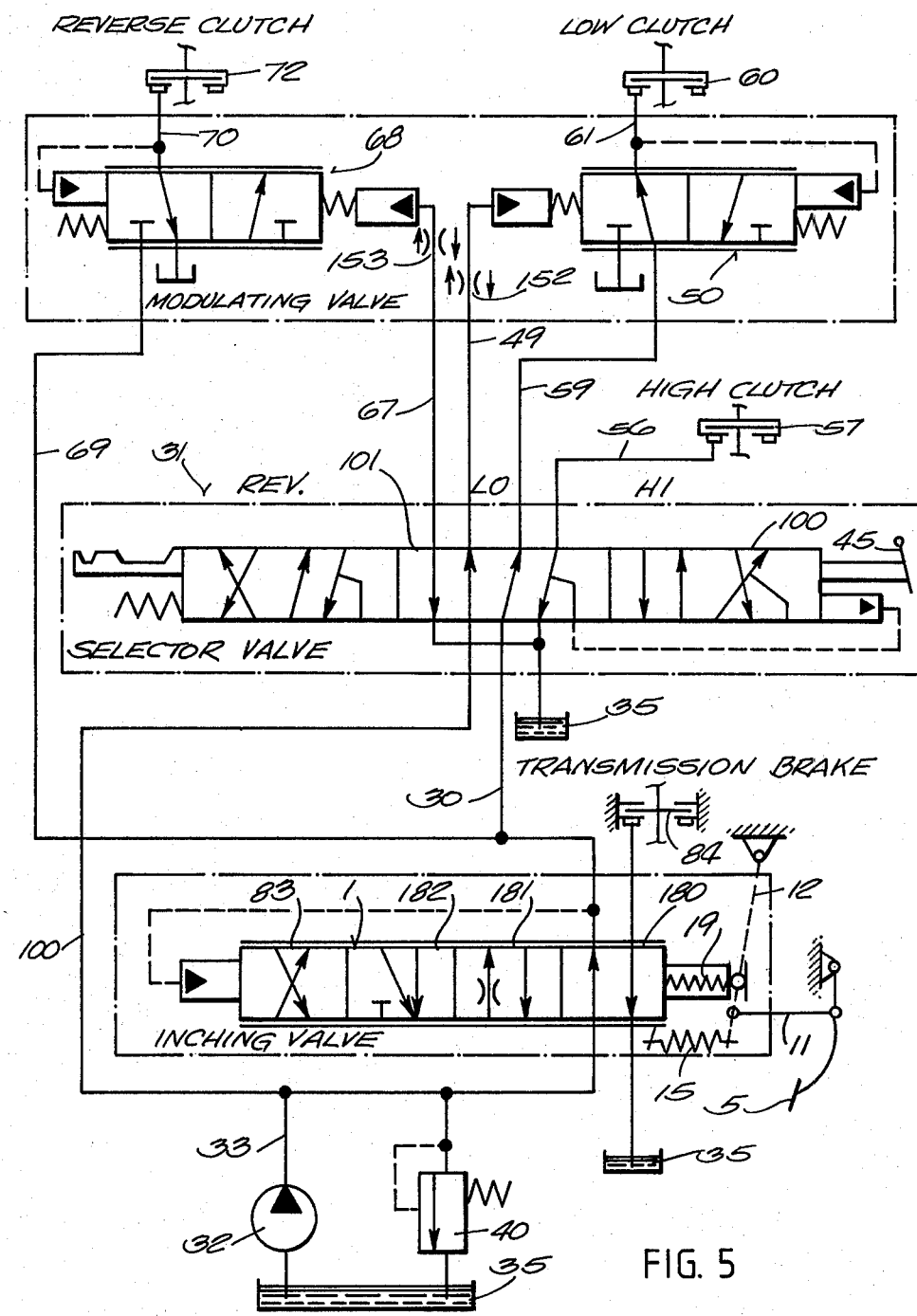
FIG. 5 is a schematic illustration of a hydraulic system including the inching valve, the speed range selector valve and the modulating valves for a power shift transmission of a vehicle.

Referring to FIG. 3, the transmission speed range selector valve 31 is shown. The valve includes a housing 41 forming a central opening 42 receiving the spool 43. A detent mechanism 44 is provided on the left-hand end of the spool as shown in FIG. 3. The right-hand end of the spool is operated by a control lever 45 pivotally supported on the vehicle chassis 6.

When the speed range selector valve 31 is shifted to the reverse position, pressure chamber 150 is communicated with accumulator chamber 66 to conduit 67 through orifice 153 to reverse range accumulator 68. Accumulator passage 48 is shut off from pressure chamber 150 and communicated with sump chamber 52 allowing pressurized low range clutch accumulator 50 to vent to sump through orifice 152 and conduit 49 to accumulator passage 48. Pressure passage 47 is still in communication with low range clutch passage 58 and conduit 59, but as pressure decays in low range clutch accumulator 50 pressure is deadheaded at accumulator spool 151 and low range clutch 60 through conduit 61 and accumulator spool 151 is vented to sump through conduit 135. Pressure passage 47 is also communicated to accumulator valve through conduit 69 as pressure increases in reverse range clutch accumulator 68. Accumulator spool 154 is shifted until pressure communicates through accumulator spool 154 and conduit 70 and reverse range clutch 72 is engaged.

Conduit 30 is connected through conduit 69 to the reverse speed range accumulator 68, and through conduit 70 to the reverse speed range clutch 72. Each of the accumulators modulate the fluid as they are connected to the respective engaging clutch. In the low-reverse or reverse-low shift in one accumulator, pressure is reduced to sump pressure. The decrease in pressure is through an orifice which controls the flow from the accumulator to sump which gradually reduces the pressure on the disengaging clutch. In the other accumulator, flow through an orifice gradually increases in the accumulator and pressure is gradually increased on the oncoming clutch.

The detent mechanism 44 includes a barrel 73 having a threaded end received in the housing 41 of speed range selector valve 31. The barrel 73 is formed with annular recesses 75 and 76 on its inner periphery. The spool 43 is formed with a hollow axial passage 176 and a cross passage 77 leading from high clutch actuating chamber 54. Pressurized fluid is transmitted through the spool by means of the passage 176 and through the detent sleeve 78 through the central passage 79. Pressurized fluid is transmitted to the pressurizing chamber 80 in the end of the detent mechanism 44. When the high clutch engaging chamber 54 is connected to the passage 47, pressurized fluid in the chamber 80 biases the spool in the right-hand position, as shown. The right-hand movement of the spool is limited by the spacer 81 fitted around the return spring 82. Return spring 82 returns the spool in the left-hand direction when the pressure in the chamber 80 is decreased a predetermined level.

The detent 84 includes two spherical balls 85 and 86 biased radially by the spring 87. When the spool moves in the left-hand direction in response to the biasing forces of the return spring 82, the detent 84 will stop the spool in the low clutch operating range defined by the annular recess 76. This is controlled by the degree of compressive force exerted by the return spring 82 and also the force of the detent spring 87 which arrests the left-hand movement and retains the spool in the low clutch engaging position as indicated.

The device operates in the following described manner. The pump 32 pressurizes fluid in the hydraulic system and supplies pressurized fluid to the inching valve 1, the transmission selector valve 31 and the modulating valve 153. Normally, the inching valve is in the clutch actuating position in which the clutch pedal is in the clutch engaged position. The transmission brake 84 is disengaged. Accordingly, the selector valve 31 can be manually shifted between the high, low and reverse positions. Since the hydraulic circuit is adapted for use with a power shift transmission, the shifting of the clutches between high, low and reverse positions can be controlled by the manual control lever 45 while the vehicle is on the go. The modulating valve 155 modulates fluid pressure for a smooth transmission of power when the selector valve 31 is shifted to the low clutch or the reverse clutch positions. The modulating valve includes an accumulator which is connected in the circuit as the circuit charges for supplying an increasing pressure to the engaging clutch as it begins to transmit power. With the accumulator charging, the pressure applied to the clutch which is being engaged increases and this clutch eventually takes over for power transmission. The other accumulator valve controlling the disengaging clutch discharges through an orifice to reduce the pressure applied on the initially engaged clutch. The disengagement is gradual and the pressure eventually is reduced below the pressure for the clutch which is being engaged. At this point, the disengaging clutch no longer transmits power and the engaging clutch takes over and the drive for the transmission is transmitted through the engaged clutch.

A manually modulated control is provided by the inching valve 1. The valve is operated by the clutch pedal 5. As the clutch pedal 5 is depressed, the sections of the inching valve are sequentially moved to the right. The clutch engaging position 180 shifts to the right through the throttling position 181, and the dwell section 182 of the clutch where both clutch and brake are disengaged. Further depressing of the clutch and brake pedal 5 will position the brake engaging section 83 of the inching valve to operate the transmission brake 84.

During the initial portion of the brake pedal movement, hydraulic fluid passing through the inching valve is throttled. Throttling of the pressurized valve through the inching valve reduces the pressure of the pressurized fluid supplied to the transmission shift range selector valve 31. The throttled fluid applied to the transmission speed range selector valve 31 reduces the pressure in the valve and also in the pressurizing chamber 80. As the pressure in the pressurizing chamber 80 drops below a predetermined level, the return spring 82 will bias the spool 43 in the left-hand direction and will shift from the high speed clutch engaging position section 100 to the low speed clutch range section 101. The spool movement will be arrested when the detent 84 engages the annular recess 76. The inching valve of the vehicle provides for manual modification of the pressurized fluid through the low speed clutch 60.

Shifting of the transmission speed range shifter selector valve 31 from the low speed range is accomplished manually by moving the shift lever 45. The shift lever can be shifted to the reverse position in which the modulator valves 50 and 68 automatically modulate fluid pressure for transfer of the drive through the transmission from the low speed clutch 60 to the reverse speed clutch 72. The detent 84 retains the valve in this position. The reverse situation is accomplished when shifting from the reverse position to the low speed clutch position by moving the lever 45 back to the low speed range position.

The embodiments of the invention in which an exclusive property or privilege is claimed are defined as follows:

1. A transmission selector valve having a detent mechanism and operating in a pressurized hydraulic fluid system comprising, a valve housing defining a central opening, a spool reciprocably mounted in said central opening selectively defining at least three speed range positions including a high and a low position, resilient means normally biasing said spool to the low speed range position, said housing and spool defining a fluid pressure chamber receiving pressurized fluid from the hydraulic system for biasing said spool against the resilient means to the high speed range and holding said spool in the high speed range position when the valve spool is in the high speed range position, a plurality of grooves in said housing defining reverse, low and high detent stop positions of said valve spool, a detent mechanism including detent elements biased radially for selective reception in said grooves, throttling means in said hydraulic fluid system upstream from said selector valve for reducing pressure of hydraulic fluid supplied to said selector valve and the hydraulic fluid in said pressurizing chamber thereby releasing said spool allowing said resilient means of said valve to return said spool from the high speed range position to the low speed range position, said detent mechanism arresting movement of said valve spool and retaining said valve spool in the low speed range position responsive to the predetermined decrease in pressure in said pressurizing chamber.

2. A transmission selector valve having a detent mechanism and operating in a pressurized hydraulic fluid system as set forth in claim 1 including, a power shift transmission including at least three hydraulically actuated clutches, said speed range selector valve controlling engagement and disengagement of said clutches.

3. A transmission selector valve having a detent mechanism and operating in a pressurized hydraulic fluid system as set forth in claim 1 wherein said throttling means upstream from said transmission selector valve includes an inching valve, manual means for modulating pressurized fluid in said inching valve and supplying modulated fluid to said transmission speed range selector valve.

4. A transmission selector valve having a detent mechanism and operating in a pressurized hydraulic fluid system as set forth in claim 1, including at least three clutches each having a hydraulic actuator for engaging a respective clutch, said clutches defining a high speed range clutch, a low speed range clutch and a reverse speed range clutch, means for selectively shifting said transmission speed range selector valve selectively to each of said speed ranges.

5. A transmission selector having a detent mechanism and operating in a pressurized hydraulic fluid system as set forth in claim 1 including, a low speed range clutch and a reverse speed range clutch in said hydraulic system, an accumulator for each of said low speed range clutch and reverse speed range clutches for automatically modulating fluid supplied to said low speed and reverse speed range clutches as said transmission speed range selector valve is shifted.

6. A transmission selector valve having a detent mechanism and operating in a pressurized hydraulic fluid system as set forth in claim 1, wherein said plurality of annular grooves define a low and a reverse position, said detent mechanism selectively retaining said spool valve in said low and reverse speed range positions defined by said annular grooves in said housing, fluid pressure in said pressurizing chamber retains said spool a high speed range position.

7. A transmission selector valve having a detent mechanism and operating in a pressurized hydraulic fluid system as set forth in claim 1, wherein said transmission speed range selector valve defines sequential positions of high, low and reverse.

8. A transmission selector valve having a detent mechanism and operating in a pressurized hydraulic fluid system as set forth in claim 1, wherein said throttling means defines an inching valve, a transmission brake connected to said inching valve for selectively directing pressurized fluid to said transmission speed range selector valve and said transmission brake.

9. A transmission selector valve having a detent mechanism and operating in a pressurized hydraulic fluid system as set forth in claim 1 including, a power shift transmission, said transmission speed range selector valve selectively shifting said power shift transmission, said power shift transmission defining clutches for operating in a high, low and reverse position.

10. A transmission selector valve having a detent mechanism and operating in a pressurized hydraulic fluid system as set forth in claim 1 including, a detent spring selectively and alternatively biasing said detent elements in said grooves to define said low and reverse positions, said detent mechanism arresting movement from the high speed range to the low speed range in said detent mechanism responsive to said return spring for positioning said speed range selector valve in the low range position when pressurized fluid from said throttling means is decreased below a predetermined level in said pressurizing chamber.

* * * * *